United States Patent [19]

Fowler et al.

[11] 4,319,230
[45] Mar. 9, 1982

[54] RADIO ALARM SYSTEM

[76] Inventors: Eugene W. Fowler, 816 Superba Ave., Venice, Calif. 90291; Raymond W. Fowler, 2465 Amherst Ave., Los Angeles, Calif. 90064

[21] Appl. No.: 112,209

[22] Filed: Jan. 15, 1980

[51] Int. Cl.³ ............................................. B60R 25/10
[52] U.S. Cl. ..................... 340/539; 340/63; 307/10 AT
[58] Field of Search ................ 340/52 F, 63, 64, 539; 307/10 AT

[56] References Cited

U.S. PATENT DOCUMENTS

2,780,693  2/1957  McClellan ........................... 340/666
4,141,009  2/1979  Fowler ................................ 340/539

Primary Examiner—Alvin H. Waring
Attorney, Agent, or Firm—Daniel J. Tick

[57] ABSTRACT

Electrically conductive leads of a radio alarm system electrically connect a relay, a source of electrical energy and a radio transmitter in a back up circuit. The relay is energized by electrical conductors of an electric circuit of the radio alarm system having switches, and maintains the relay normally open as long as the radio alarm system is in operative condition. When an electrical conductor of the radio alarm system is open-circuited, the relay is deenergized and closes the back up circuit to actuate the transmitter to transmit radio signals indicating that an electrical conductor of a closed circuit of the radio alarm system has been open-circuited.

18 Claims, 13 Drawing Figures

RADIO ALARM SYSTEM

BACKGROUND OF THE INVENTION

The present invention relates to a radio alarm system. More particularly, the invention relates to a radio alarm system with back up capability having electric circuits for monitoring, controlling, operating and utilizing an electric circuit having electrical conductors including switches.

The prior art embodiments of FIGS. 1 to 4 are disclosed in U.S. Pat. No. 4,012,728, issued to the present inventor on Mar. 15, 1977 and the prior art embodiments of FIGS. 1 to 6 are disclosed in U.S. Pat. No.4,141,009, issued to the present inventor on Feb. 20, 1979.

The present era is one in which there is very little regard, by a large number of people, for the property or lives of others. Thus, unprecedented record numbers of burglaries, car thefts and robberies and thefts of all types are perpetrated every day, all over the world. Many thieves and burglars have become proficient enough in their activities to destroy the efficacy of burglar alarm systems by cutting electrical circuits of said systems. An open-circuited system does not function to warn of a theft in progress and is therefore worthless.

The principal object of the invention is to provide a radio alarm system for complete protection from burglary and theft.

An object of the invention is to provide a radio alarm system for completely protecting any enclosure such as, for example, a house, building, structure, room or rooms of a structure, vehicle, motor vehicle, aircraft, marine craft, and the like, from burglary and theft.

Another object of the invention is to provide a radio alarm system of simple structure which functions more effectively and rapidly than known types of burglar alarm systems to completely protect an enclosed area from burglary and theft.

Still another object of the invention is to provide a radio alarm system for indicating the position of a stolen vehicle.

Yet another object of the invention is to provide a radio alarm system for complete protection from burglary, theft, fire, illicit entry, and so on.

Another object of the invention is to provide a radio alarm system for completely protecting any enclosure such as, for example, a house, building, structure, room or rooms of a structure, vehicle, motor vehicle, aircraft, marine craft, and the like, from burglary, theft, fire, illicit entry, and so on.

Still another object of the invention is to provide a radio alarm system of simple structure which functions more effectively and rapidly than known types of burglar alarm systems to completely protect an enclosed area from burglary, theft, fire, illicit entry, and so on.

The radio alarm system of the invention functions efficiently, effectively and reliably to warn, via wireless transmission, of the cutting of an electrical conductor of a circuit of a burglar alarm system and to warn of the short-circuiting of electrical conductors of the burglar alarm system.

BRIEF SUMMARY OF THE INVENTION

In accordance with the invention, a radio alarm system with back up capability having electric circuits for monitoring, controlling, operating and utilizing an electric circuit having electrical conductors including normally closed switches, comprises a relay having electrical conductors. A source of electrical energy and a radio transmitter for transmitting radio signals are provided. Electrically conductive leads electrically connect the relay, the source of electrical energy and the radio transmitter in a back up circuit in a manner whereby the relay is energized by electrical conductors of the electric circuit having normally closed switches and maintains the relay normally open as long as the radio alarm system is in operative condition. When an electrical conductor of the radio alarm system is open-circuited, the relay is deenergized and closes the back up circuit to actuate the transmitter to transmit radio signals indicating that an electrical conductor of a closed circuit of the radio alarm system has been open-circuited. The closed circuit of the radio alarm system and the back up circuit constitute different circuits.

In accordance with the invention, a radio alarm system with back up capability having electric circuits for monitoring, controlling, operating and utilizing an electric circuit having electrical conductors including normally open switches, a negative electrical conductor and a positive electrical conductor comprises a relay having electrical conductors. A source of electrical energy and a radio transmitter for transmitting radio signals are provided. Electrically conductive leads electrically connect the relay, the source of electrical energy and the radio transmitter in a back up circuit in a manner whereby the relay is energized by electrical conductors of the electric circuit having normally open switches and maintains the relay normally open as long as the radio alarm system is in operative condition. When a negative electrical conductor of the radio alarm system is short-circuited with a positive electrical conductor of the radio alarm system, the relay is deenergized and closes the back up circuit to actuate the transmitter to transmit radio signals indicating that an electrical conductor of the radio alarm system has been short-circuited. The short-circuited circuit of the radio alarm system and the back up circuit constitute different circuits.

In accordance with the invention, a radio alarm system with back up capability having electric circuits for monitoring, controlling, operating and utilizing an electric circuit having electrical conductors including normally open switches, comprises a relay having electrical conductors. A source of electrical energy and a radio transmitter for transmitting radio signals are provided. Electrically conductive leads electrically connect the relay, the source of electrical energy and the radio transmitter in a back up circuit in a manner whereby the relay is maintained unenergized by electrical conductors of the electric circuit having normally open switches and maintains the relay normally open as long as the radio alarm system is in operative condition. When an electrical conductor of the radio alarm system is energized the relay is energized and closes the back up circuit to actuate the transmitter to transmit radio signals indicating that an electrical conductor of a circuit of the radio alarm circuit has been energized.

An alarm switch for actuating an alarm, a fire detector for detecting fire and a panic switch are electrically connected to the relay device. The panic switch is manually operable for secret operation of an alarm.

A plurality of fire detectors are electrically connected to the relay device and positioned at different locations in an area for detecting fire occurring in the area.

A plurality of alarm switches are electrically connected to the relay device and positioned at different locations in an area for actuating an alarm.

The radio alarm system is installed in a vehicle having an interior light source and a plurality of vehicle door light switches electrically connected to the relay device and between the source of electrical energy and the light source in a manner whereby the light source is energized by the operation of any one of the light switches and remains so energized.

A radio receiver receives signals transmitted by the radio transmitter thereby indicating an alarm condition.

A radio receiver has a direction finder for locating the position of the radio transmitter and receives signals transmitted by the radio transmitter thereby indicating an alarm condition.

A reset device electrically connected to the relay manually resets the back up circuit. The reset device comprises a reset switch or a combination reset control switch.

A mat switch is electrically connected to the relay device for actuating an alarm when stepped on by a person.

A trap is electrically connected to the relay device and placed in an entry area for actuating the alarm when opened. The trap comprises a plurality of normally closed alarm switches.

A control switch is electrically connected to the relay device for controlling an entry area to permit a person to pass through a controlled area without actuating the alarm. The control switch is manually reset to operable condition after operation.

The reset device comprises a reset switch.

The reset device comprises a combination reset control switch.

The reset switch comprises a push-button switch which resets the relay device when manually depressed and is reset automatically when manually released thereby placing the alarm in operating condition.

The mat switch comprises a pair of superimposed wire screens separated by electrical insulation and covered by electrically non-conductive material. The screens are pressed together by the weight of the person to close a circuit and actuate an alarm.

BRIEF DESCRIPTION OF THE DRAWINGS

In order that the invention may be readily carried into effect, it will now be described with reference to the accompanying drawings, wherein.

DETAILED DESCRIPTION OF THE INVENTION

The radio alarm system of the invention has back up capability and electric circuits for monitoring, controlling, operating and utilizing an electric circuit in an effectively reliable manner to provide security.

The prior art first to third embodiments of the invention are described in U.S. Pat. No. 4,012,728 and the prior art first to fifth embodiments of the invention are described in U.S. Pat. No. 4,141,009.

Figure 1:
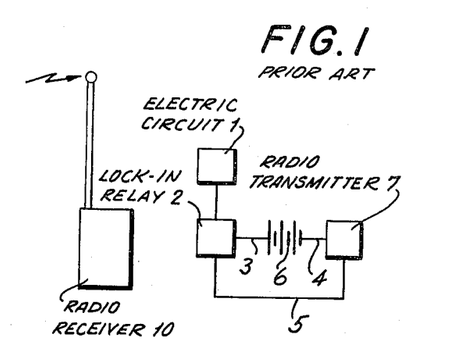
FIG. 1 is a block diagram illustrating the basic prior art radio alarm system of the invention.
Figure 2:
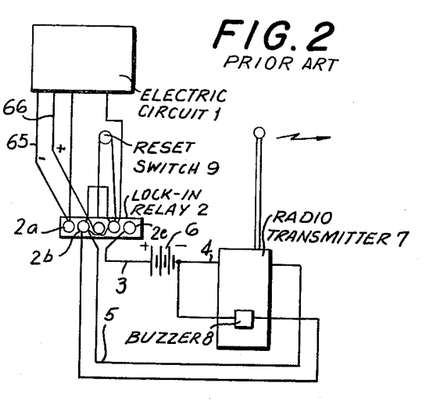
FIG. 2 is a block diagram of a first prior art embodiment of the radio alarm system of the invention.

The first embodiment of the invention, shown in FIG. 2, is a back up alarm system for a burglar alarm system including an electric circuit 1 having electrical conductors (not shown in the FIGS.). The second and third embodiments of the invention, shown in FIGS. 3 and 4, are back up alarm systems for monitoring a burglar alarm system including the electric circuit 1.

The back up alarm system of the invention comprises a lock-in relay 2 electrically connected to the electric circuit 1 of the burglar alarm system. The lock-in relay 2 may comprise any suitable relay having an energizing winding $2f$ and a relay switch or relay contacts $2g$ controlled in position by such energizing winding. In the first embodiment of the invention, shown in FIG. 2, the energizing winding $2f$ of the lock-in relay 2 is energized by the circuit 1 of the burglar alarm system and maintains the relay contacts normally open. Thus, as long as the circuit 1 is closed and the burglar alarm system is in operative condition, the relay contacts $2g$ are open. As soon as a conductor of the circuit 1 of the embodiment of FIG. 2 is cut or short-circuited by a burglar, or due to any other circumstances, so that the burglar alarm system becomes inoperative, the relay energizing winding $2f$ of the lock-in relay 2 closes the relay contacts thereof, and said relay energizing winding remains de-energized until it is reset by a reset switch, hereinafter described. In FIG. 2, the electric circuit 1 activates the back up circuit to energize the radio transmitter 7. The back up alarm system includes and monitors the electric circuit 1.

Figure 3:
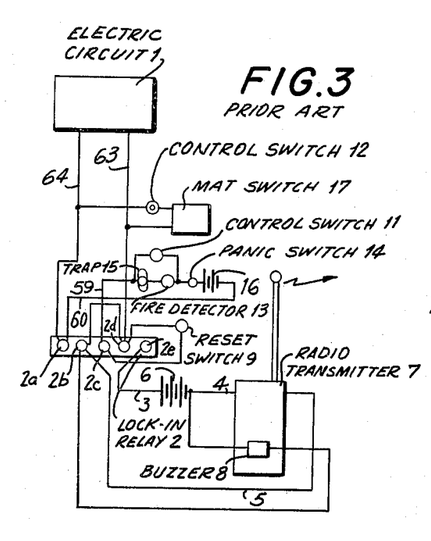
FIG. 3 is a block diagram of a second prior art embodiment of the radio alarm system of the invention.
Figure 4:
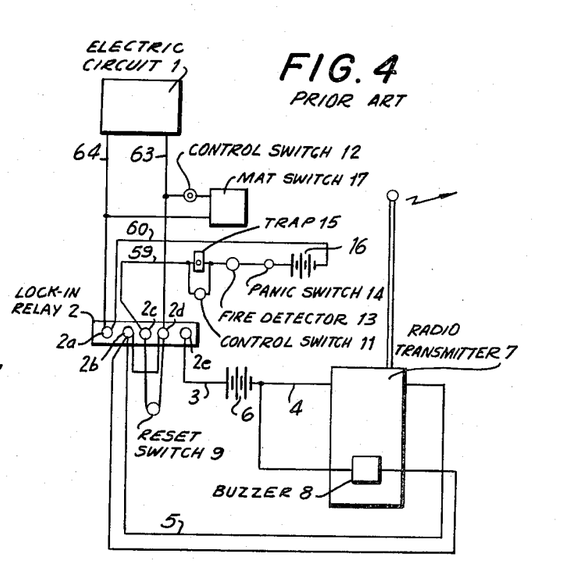
FIG. 4 is a block diagram of a third prior art embodiment of the radio alarm system of the invention.

The embodiments of FIGS. 3 and 4 are the same as in the embodiment of FIG. 2, with an exception. When an electrical conductor of the circuit 1 is short-circuited, the relay energizing winding $2f$ of the lock-in relay 2 becomes deenergized and permits the relay contacts $2g$ thereof to close. The relay energizing winding $2f$ of the lock-in relay 2 remains deenergized until it is reset by the reset switch 9. In FIGS. 3 and 4, the electric circuit 1 activates the back up alarm circuit to energize the transmitter 7. The back up alarm system activates and monitors the electric circuit 1.

Figure 5:
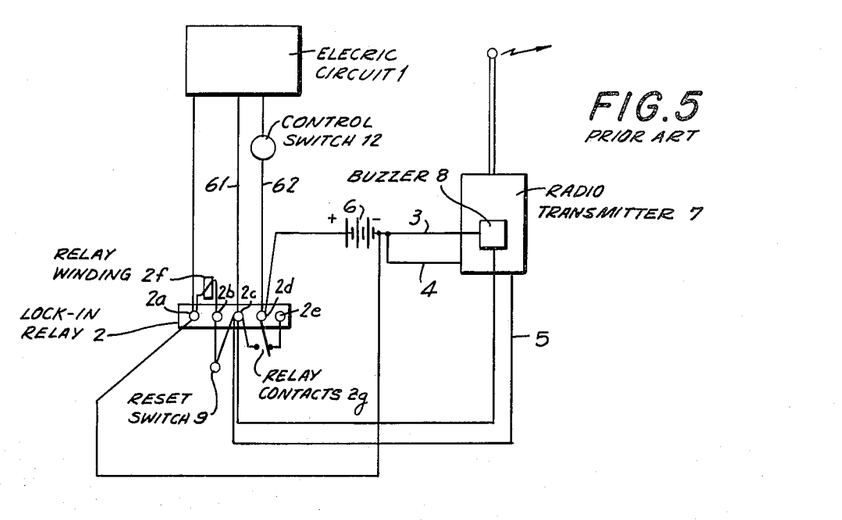
FIG. 5 is a block diagram of a fourth prior art embodiment of the radio alarm system of the invention.

In the fourth embodiment of the invention shown in FIG. 5, the relay energizing winding $2f$ of the lock-in relay 2 is maintained deenergized by the electric circuit 1 and said circuit maintains the relay contacts $2g$ normally open, so that as long as the back up alarm system is in operative condition, said relay contacts are open.

Figure 6:
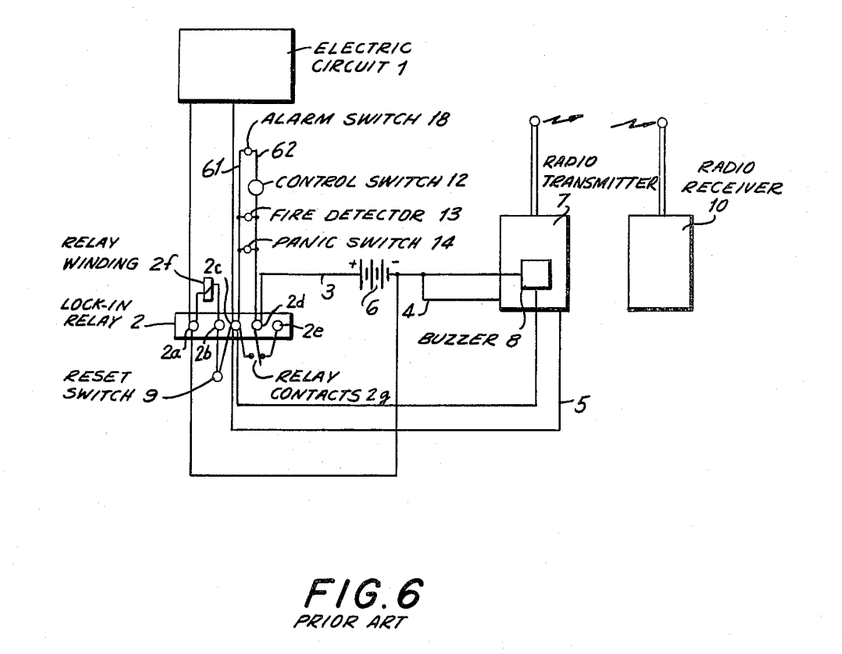
FIG. 6 is a block diagram of a fifth prior art embodiment of the radio alarm system of the invention.

In the fifth embodiment of the invention, shown in FIG. 6, the relay energizing winding 2f of the lock-in relay 2 is maintained deenergized by the back up alarm system and the circuit 1 maintains the relay contacts 2g normally open, so that as long as the back up alarm system is in operative condition, said relay contacts are open. In the embodiment of FIG. 5, when an electrical conductor of the electric circuit 1 is energized or short-circuited by a burglar, or due to any other circumstances, so that the burglar alarm system becomes inoperative, the relay energizing winding of the lock-in relay 2 is energized and closes the relay contacts thereof. The relay energizing winding 2f of the lock-in relay 2 remains energized, activating the back up alarm system until it is reset by the reset switch. In FIG. 5, the circuit 1 activates the back up alarm, indicating an alarm condition. The back up alarm monitors and controls the circuit 1.

In the embodiment of FIG. 6, the panic switch 14, the fire detector 13 and the alarm switch 18 activate the electric circuit 1. The circuit 1 will not activate the back up alarm system. The back up alarm system monitors, controls and operates the electric circuit 1.

Figures 7, 8:
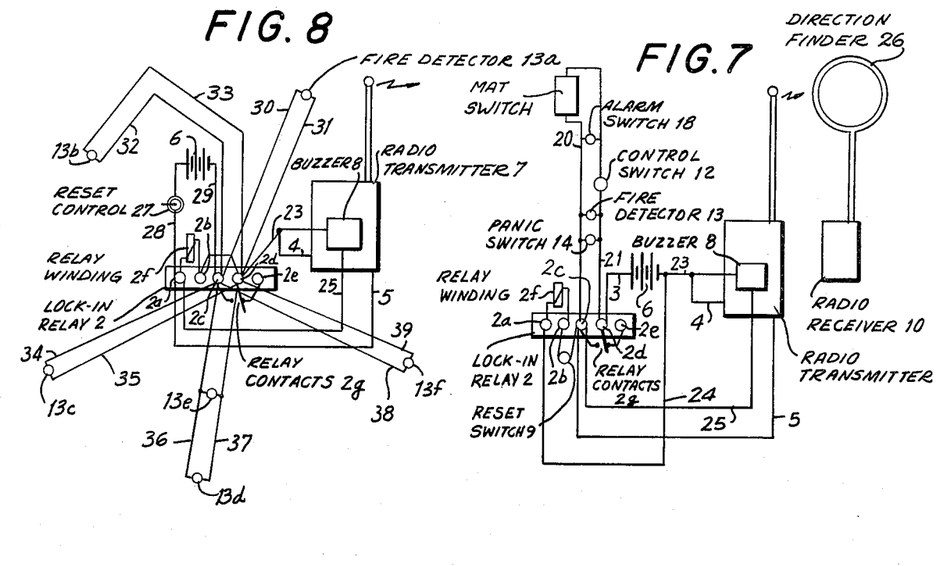
FIG. 7 is a block diagram of a sixth embodiment of the radio alarm system of the invention.
FIG. 8 is a block diagram of a seventh embodiment of the radio alarm system of the invention.

The sixth embodiment of the radio alarm system of the invention, shown in FIG. 7, is an industry, residential alarm system wherein the alarm switch 18, the fire detector 13 and the panic switch 14 are electrically connected in parallel between an electrical conductor 20 connected to a terminal 2c of the lock-in relay 2 and an electrical conductor 21 connected to a terminal 2d of said relay. The control switch 12 is connected in series, in the lead 21, between the switch 18 and the detector 13. The relay winding 2f of the lock-in relay 2 is connected between the terminals 2a and 2b of said relay. The relay contacts 2g of the lock-in relay 2 are connected to the terminals 2c and 2e of said relay. The reset switch 9 is connected between the terminals 2b and 2c of the lock-in relay 2.

The electrical conductor or lead 3 is connected between the terminal 2d of the lock-in relay 2 and the positive polarity terminal of the battery 6. The negative polarity terminal of the battery 6 is electrically connected to the buzzer 8 via an electrical conductor or lead 23, to the terminal 2a of the lock-in relay 2 via an electrical conductor or lead 24 and to the radio transmitter 7 via the leads 23 and 4. The buzzer 8 is connected to the terminal 2c of the lock-in relay 2 via an electrical conductor or lead 25 and the radio transmitter 7 is connected to the said terminal via the lead 5.

The alarm switch, or switches, 18 activates an alarm and is normally open and, when closed, actuates the lock-in relay 2. It is placed in doorways, windows, and other entry areas. The panic switch 14 is a push-button switch which actuates the alarm when depressed, thereby providing a secret manual actuation of the alarm in the event of fire, theft, illicit entry, or the like. The panic switch 14 is electrically connected to the lock-in relay 2 and is reset automatically, when released, so that it returns to its normal condition for later use after resetting of the alarm via the reset switch.

The control switch 12 functions, as does the control switch 11, to control an entry area to enable a person or object to pass through the controlled alarm area, while the alarm is in operating condition, without actuating the alarm. When the authorized person leaves the entry area, the control switch 12 is turned back to its alarm condition, as is the control switch 11, so that the alarm will be actuated upon an unauthorized entry. The mat switch 17 has two electrically conductive wire screens superimposed on each other and separated by an insulator. The screens may be covered by rubber or any suitable plastic. When an electrical non-conductor or intruder steps or an object exerts gravitational force on the mat, the screens are pressed together and close the alarm circuit. The mat switch 17 is placed in entry areas, under rugs, in doorways, and so on.

In accordance with the invention, the radio receiver 10 of FIG. 7 includes a direction finder 26 of any suitable type, which functions in the usual manner to locate the position of the radio transmitter 7 whose signals are received by said radio receiver.

The seventh embodiment of the radio alarm system of the invention, shown in FIG. 8, functions as a fire alarm system. In FIG. 8, the battery 6 is electrically connected in series with a reset control 27 between the terminals 2a and 2c of the lock-in relay 2 via electrical conductors 28 and 29. The lead 25 connects the buzzer 8 to the terminal 2a of the lock-in relay 2 and the lead 5 connects the radio transmitter 7 to the terminal 2a of said relay.

In FIG. 8, a plurality of the fire detectors 13a, 13b, 13c, 13d, 13e and 13f are positioned throughout an area to be protected. The fire detector 13a is electrically connected to the terminals 2c and 2d of the lock-in relay 2 via electrical conductors 30 and 31. The fire detector 13b is electrically connected to the terminals 2c and 2d of the lock-in relay 2 via electrical conductors 32 and 33. The fire detector 13c is electrically connected to the terminals 2c and 2d of the lock-in relay 2 via electrical conductors 34 and 35. The fire detectors 13d and 13e are electrically connected in parallel to the terminals 2c and 2d of the lock-in relay 2 via electrical conductors 36 and 37. The fire detector 13f is electrically connected to the terminals 2c and 2d of the lock-in relay 2 via electrical conductors 38 and 39.

Figures 9, 10:
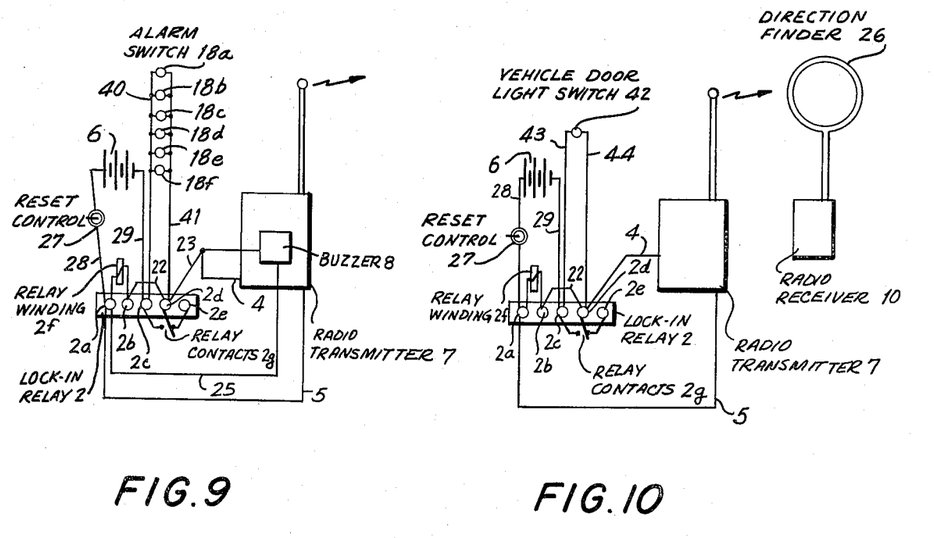
FIG. 9 is a block diagram of an eighth embodiment of the radio alarm system of the invention.
FIG. 10 is a block diagram of a ninth embodiment of the radio alarm system of the invention.

The eighth embodiment of the radio alarm system of the invention, shown in FIG. 9, has the battery 6 and the reset control 27 connected in the same manner as in FIG. 8. The buzzer 8 and radio transmitter 7 are connected to the terminal 2a of the lock-in relay 2, in the same manner as in FIG. 8.

In FIG. 9, which functions as a vehicle alarm system, a plurality of alarm switches 18a, 18b, 18c, 18d, 18e and 18f are connected in parallel to the terminals 2c and 2d of the lock-in relay 2 via electrical conductors 40 and 41.

The ninth embodiment of the radio alarm system of the invention, shown in FIG. 10, also functions as a vehicle alarm system. In FIG. 10, the battery 6 and the reset control 27 are connected in the same manner as in FIGS. 8 and 9, and the radio transmitter 7 is connected to the terminal 2a of the lock-in relay 2.

The radio receiver 10 of FIG. 10 includes the direction finder 26, as in FIG. 7.

In accordance with the invention, a vehicle door light switch 42 is electrically connected to the terminals 2c and 2d of the lock-in relay 2 via electrical conductors or leads 43 and 44 (FIG. 10).

Figure 11:
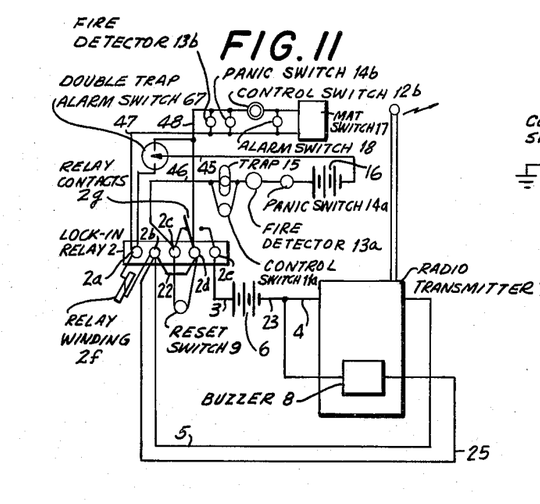
FIG. 11 is a block diagram of a tenth embodiment of the radio alarm system of the invention.

The tenth embodiment of the radio alarm system of the invention, shown in FIG. 11, functions as an industry, residential alarm system, as does FIG. 7. In FIG. 11, the buzzer 8 and the radio transmitter 7 are connected to the terminal 2b of the lock-in relay 2. The reset switch 9 is connected between the terminals 2c and 2d of the lock-in relay 2. The battery 16, the panic switch 14a, the fire detector 13a and the trap 15 are connected in series between the terminals 2a and 2c of the lock-in relay 2 via electrical conductors or leads 45 and 46. The control switch 11 is connected in shunt with the trap 15.

In FIG. 11, the mat switch 17, the alarm switch 18, the panic switch 14b and the fire detector 13b are electrically connected in parallel to the terminals 2a and 2d of the lock-in relay 2 via electrical conductors or leads 47 and 48. The control switch 12 is connected in the lead 48 between the panic switch 14b and the alarm switch 18.

The trap 15 is a normally closed switch, or switches, which actuates the lock-in relay 2 when opened, thereby actuating the alarm when opened. The trap 15 is thus an alarm switch, or switches, connected to the alarm, which safeguards an area from intruders by actuating an alarm upon intrusion by a person or object. It is placed in doorways, windows and other entry areas.

Figure 12:
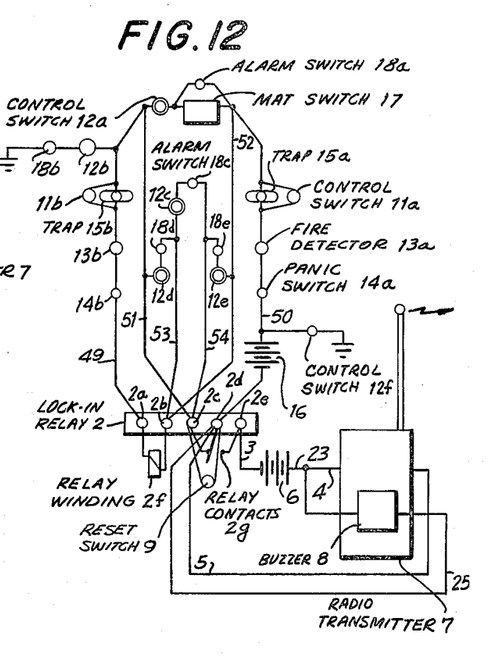
FIG. 12 is a block diagram of an eleventh embodiment of the radio alarm system of the invention.

The eleventh embodiment of the radio alarm system of the invention, shown in FIG. 12, functions as a fence alarm system. The buzzer 8 and the radio transmitter 7 in FIG. 12 are connected to the terminal 2d of the lock-in relay 2. The reset switch 9 is connected between the terminals 2c and 2d of the lock-in relay 2.

In FIG. 12, the battery 16, the panic switch 14a, the fire detector 13a, the trap 15a, the mat switch 17, the control switch 12a, the trap 15b, the fire detector 13b and the panic switch 14b are electrically connected in series between the terminals 2a and 2d of the lock-in relay 2 via electrical conductors or leads 49 and 50. The alarm switch 18a is connected in parallel or shunt, with the mat switch 17. An electrical conductor or lead 51 is connected between the terminal 2c of the lock-in relay 2 and the conductor 49 at a point between the control switch 12a and the trap 15b. A conductor or lead 52 is connected between the terminal 2b of the lock-in relay 2 and the conductor 50 at a point between the trap 15a and the mat switch 17.

The conductor 50 is connected to a point at ground potential at a point between the battery 16 and the panic switch 14a. The conductor 49 is connected to a point at ground potential, at a point between the connection with the conductor 51 and the trap 15b, via the series connection of the control switch 12b and the alarm switch 18b. The control switch 11a is connected in shunt with the trap 15a and the control switch 11b is connected in shunt with the trap 15b.

In FIG. 12, the alarm switch 18c and the control switch 12c are electrically connected in series between the terminals 2b and 2c of the lock-in relay 2 via electrical conductors or leads 53 and 54. The alarm switch 18d and the control switch 12d are electrically connected in series between the conductors 51 and 53, and are therefore connected in series between the terminals 2b and 2c via said conductors. The alarm switch 18e and the control switch 12e are electrically connected in series between the conductors 52 and 54, and are therefore connected in series between the terminals 2b and 2c via said conductors.

Figure 13:
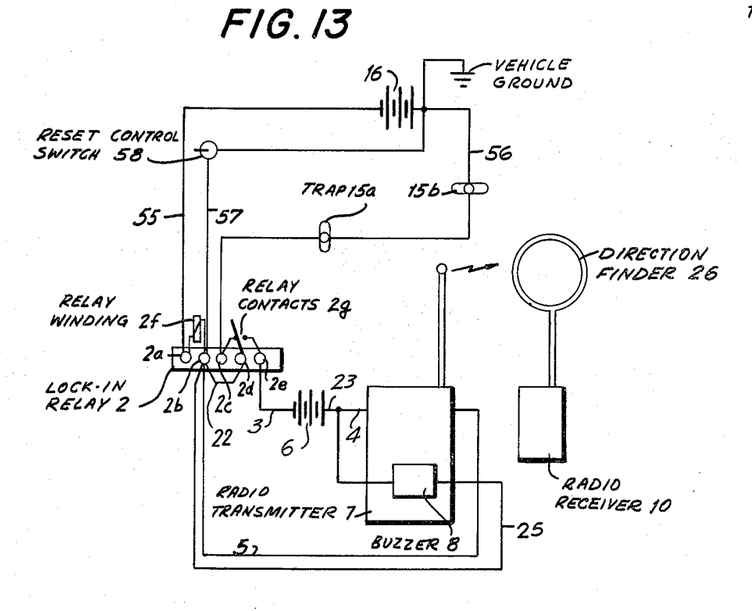
FIG. 13 is a block diagram of a twelfth embodiment of the radio alarm system of the invention.

The twelfth embodiment of the radio alarm system of the invention, shown in FIG. 13, functions as a vehicle alarm system, similarly to the embodiments of FIGS. 9 and 10. In FIG. 13, the buzzer 8 and the radio transmitter 7 are connected to the terminal 2b of the lock-in relay 2 and the radio receiver 10 includes the direction finder 26.

In FIG. 13, the battery 16 is electrically connected in series with the traps 15a and 15b between the terminals 2a and 2c of the lock-in relay 2 via electrical conductors or leads 55 and 56. The terminal 2b of the lock-in relay 2 is connected to the conductor 56, at a point between the battery 16 and the trap 15b, via an electrical conductor or lead 57 and a reset control switch 58 connected therein. The reset control switch 58 is on the grounded side of the battery 16 to prevent short-circuiting to the body of a vehicle.

The point of connection of the conductors 56 and 57 is connected to a point at ground potential.

In the embodiments of FIGS. 3, 4, 11, 12 and 13 the energizing winding of the lock-in relay 2 is energized by an energizing circuit consisting of a conductor 59 (FIGS. 3 and 4), the battery 16, a conductor 60 (FIGS. 3 and 4) and said lock-in relay. The closed energizing circuit 59, 16, 60, 2 (FIGS. 3 and 4) maintains the relay contacts 2g normally open, so that as long as the circuit is closed, and the system is in operating condition, said relay contacts are open. As soon as energized conductor 59 or 60 is cut by a burglar, or open-circuited due to any other circumstances, so that the alarm system becomes inoperative, the relay energizing winding 2f of the lock-in relay 2 closes the relay contacts 2g thereof. The relay energizing winding 2f remains deenergized until reset by the reset switch.

The eleventh embodiment of the invention, shown in FIG. 12, is the same as the embodiments of FIGS. 3, 4, 11 and 13 with an exception. In the embodiment of FIG. 12, the battery 16 is connected in the secondary energized closed circuit formed by the electrical conductors 49 and 50.

In the embodiments of FIGS. 3, 4 and 11, the energizing winding 2f of the lock-in relay 2 is energized by the electrical conductors 45 and 46, maintains the relay contacts 2g normally open, and maintains an open circuit 47, 48 deenergized. In the embodiment of FIG. 12, the energizing winding of the lock-in relay 2 maintains an open circuit 53, 54 deenergized, so that as long as the conductors 49 and 50 are energized, and the system is in operating condition, the relay contacts 2g are open. As soon as the conductors 47 and 48 of FIG. 11 and as soon as the conductors 53 and 54 of FIG. 12 are short-circuited by a burglar, or due to any other circumstances, so that the alarm system becomes inoperative, the relay energizing winding 2f of the lock-in relay 2 closes the relay contacts 2g thereof. The relay energizing winding 2f of the lock-in relay 2 remains deenergized until reset by the reset switch.

In the embodiments of FIGS. 5, 6, 7, 8, 9 and 10, the relay energizing winding 2f of the lock-in relay 2 is maintained deenergized by the circuit of the alarm system, so that as long as said alarm system is in operative condition, the relay contacts 2g are open. In FIG. 5, the control switch 12 is closed. As soon as an electrical conductor 61 or 62 of the alarm circuit is energized or short-circuited, by a burglar, fire, or due to any other circumstances, so that said alarm system becomes inoperative, the relay energizing winding 2f of the lock-in relay 2 is energized and closes the relay contacts 2g thereof. The relay energizing winding 2f remains energized until it is reset. The relay energizing winding 2f is reset by the normally closed reset switch 9 in the embodiments of FIGS. 5, 6 and 7, and by a normally closed reset control switch 27 in the embodiments of FIGS. 8, 9 and 10.

In the embodiments of FIGS. 5, 6, 7, 8, 9 and 10, as soon as a conductor 61 or 62 (FIGS. 5 and 6) of the alarm circuit is energized or short-circuited, by a burglar, fire, or due to any other circumstances, so that said alarm system becomes inoperative, the relay energizing winding 2f of the lock-in relay 2 becomes energized. Energization of the relay energizing winding 2f of the lock-in relay 2 permits the relay contacts 2g thereof to close, thereby closing a circuit to energize the radio transmitter 7. When the radio transmitter 7 is energized, it transmits radio signals indicating that an electrical conductor 61 or 62 of the alarm circuit has been energized or short-circuited, and, in the embodiment of FIG. 5, that an electrical conductor of the electric circuit 1 has been energized or short-circuited.

The ninth embodiment of the invention, shown in FIG. 10, is the same as the embodiments of FIGS. 8 and 9, except that in FIG. 10, the electrical conductors 43 and 44 of the open alarm circuit are connected to the vehicle door light switch 42 of the vehicle in which the alarm system is installed, and the alarm is in operative condition. The vehicle door light switches 42 of the vehicle, or any number of them, operate the same light of said vehicle. Thus, when the vehicle door light switch 42 becomes energized, for example, and the alarm system becomes inoperative, the battery of the vehicle energizes said door light. At the same instant the vehicle door light switch 42 becomes energized or short-circuited, the electrical conductors 43 and 44 to the relay energizing winding 2f of the lock-in relay 2 are energized and said relay energizing winding closes the relay switch contacts 2g. When the relay switch contacts 2g are closed, the radio transmitter 7 is energized and the door light of the vehicle continues to stay on, indicating an alarm condition.

When the radio transmitter 7 of the embodiments of FIGS. 5, 6, 7, 8 and 9 is energized, it also activates an audible alarm, such as, for example, the buzzer 8. Although the buzzer 8 is not shown in FIG. 10, it may be connected therein, if desired.

In the embodiments of FIGS. 1, 2, 3, 4, 5, 6, 7, 11, 12 and 13, the radio alarm system comprises the electrically conductive leads or conductors 3, 4 and 5, electrically connecting the lock-in relay 2, the source of electrical energy 6 and the radio transmitter 7 in a back up circuit indicating an alarm condition. The embodiments of FIGS. 8, 9 and 10 are the same as the embodiments of FIGS. 1, 2, 3, 4, 5, 6, 7, 11, 12 and 13, except that the electrically conductive lead 3 is omitted in FIGS. 8, 9 and 10.

In the embodiment of FIG. 2, when an energized electrical conductor of the circuit 1 is cut or short-circuited, the relay energizing winding 2f of the lock-in relay 2 becomes deenergized and permits the relay contacts thereof to close, thereby closing the back up circuit to energize the radio transmitter 7.

In the embodiments of FIGS. 3 and 4, when an electrical conductor of the circuit 1 is short-circuited, or when open conductors 63 and 64 are short-circuited by the normally open mat switch 17, the relay energizing winding 2f of the lock-in relay 2 becomes deenergized and permits the relay contacts 2g thereof to close, thereby closing the back up circuit to actuate the radio transmitter 7.

In the embodiments of FIGS. 3 and 4, when an energized electrical conductor of the closed energizing circuit 59, 60 is cut, the relay energizing winding 2f of the lock-in relay 2 becomes deenergized and permits the relay contacts 2g thereof to close, thereby closing the back up circuit to actuate the radio transmitter 7.

In the embodiment of FIG. 11, when the electrical conductors 47, 48 are short-circuited, the relay energizing winding 2f of the lock-in relay 2 becomes deenergized and permits the relay contacts 2g thereof to close, thereby closing the alarm circuit to actuate the radio transmitter 7. In the embodiments of FIGS. 11, 12 and 13, when the energized closed conductor 45 or 46 (FIG. 11) is cut or open-circuited due to any other circumstances, the relay energizing winding 2f of the lock-in relay 2 becomes deenergized and permits the relay contacts 2g thereof to close, thereby closing the alarm circuit to energize the radio transmitter 7.

When the radio transmitter 7 of the embodiment of FIG. 11 is energized or actuated, it transmits radio signals indicating that either or both of the conductors 47 and 48 have been short-circuited. When the radio transmitter 7 of the embodiments of FIGS. 11, 12 and 13 is energized or activated, it transmits radio signals indicating that a closed energized electrical conductor 45 or 46 (FIG. 11), closed energized electrical conductor 49, 50, 51 or 52 (FIG. 12), or closed energized electrical conductor 55 or 56 (FIG. 13) has been open-circuited or cut. It also activates an audible alarm, such as, for example, the buzzer 8.

When the radio transmitter 7 of the embodiments of FIGS. 2, 3 and 4 is energized or actuated, it transmits radio signals indicating that a closed energized electrical conductor 65 or 66 (FIG. 2), or 59 or 60 (FIGS. 3 and 4) of the alarm system has been open-circuited or cut, or that electrical conductors 63 and/or 64 (FIGS. 3 and 4) have been short-circuited. It also activates an audible alarm, such as, for example, the buzzer 8.

In the embodiment of FIG. 12, the normally closed control switch 12a, the normally open alarm switch 18a and the normally open mat switch 17 are connected in the closed energized field loop circuit 49, 50. The normally closed control switch 12c and normally open alarm switch 18c are connected to the electrical conductors 53 and 54. The normally closed control switch 12e and the normally open alarm switch 18e are connected between the closed energized field loop circuit conductor 50 and the conductor 54. The normally closed control switch 12f is connected between the positive terminal of the battery 16 and a point at ground potential and provides another control, from a distance, of the alarm switch 18b. The normally closed switch 12d and the normally open alarm switch 18d are connected between the closed energized field loop circuit conductor 49 and the conductor 53. A control switch 12f is connected between the electrical conductor or lead 50 and a point at ground potential. The grounded side of the battery 16 is connected to the circuit conductor 50, which includes the energizing winding 2f of the lock-in relay 2. The other side of the battery 16 is connected to a terminal of the relay 2, relay contacts, the field loop circuit conductor 49, the normally closed control switch 12b and the normally open alarm switch 18b to ground. When the alarm switch 18b is short-circuited to ground, the energizing winding 2f of the lock-in relay 2 is deenergized and closes the relay contacts 2g. This energizes or activates the radio transmitter 7.

In the embodiments of FIGS. 2, 3, 4, 11 and 12, the normally open reset switch 9 is electrically connected to the lock-in relay 2 for manually resetting the radio alarm back up circuit. In the embodiments of FIGS. 5, 6 and 7, the normally closed reset switch 9 is electrically connected to the lock-in relay 2 for manually resetting the radio alarm system back up circuit. In the embodiments of FIGS. 11 and 12, the normally open reset switch 9 is electrically connected to the lock-in relay 2 for manually resetting said relay for the circuit conductors 45 and 46 (FIG. 11) or for the conductors 49 and 50 (FIG. 12), and manually resetting said relay for the conductors 48 and 47 in the embodiment of FIG. 11 or for the conductors 53 and 54 (FIG. 12).

In the embodiment of FIG. 7, the normally closed reset switch 9 is electrically connected to the lock-in relay 2 for manually resetting said relay for the conductors 20 and 21. In the embodiment of FIG. 13, the normally open reset control switch 58 is electrically connected to the lock-in relay 2 for manual control and for manually resetting said relay for the closed energized circuit conductors 55 and 56 of FIG. 12. In the embodiments of FIGS. 8, 9 and 10, a normally closed reset control switch 27 is electrically connected to the lock-in relay 2 for manual control and for manually resetting said relay for the conductors 30 and 31, 32 and 33, 34 and 35, 36 and 37, 38 and 39 (FIG. 8), 40 and 41 (FIG. 9) or for the conductors 43 and 44 (FIG. 10).

In the embodiment of FIG. 13, the lock-in relay 2 is electrically connected to the closed energized circuit conductor 56 having the normally closed trap 15b connected therein on the grounded side of the vehicle battery 16. The conductor 57 loops back through the battery 16 and the closed energized circuit conductor 55 to the lock-in relay 2, and is controlled and reset in one operation by the reset control switch 58.

In the embodiment of FIGS. 4 and 11, the lock-in relay 2 is electrically connected to the closed energized circuit conductor 45 (FIG. 11) and the circuit conductor 60 (FIG. 4). The conductor 45 (FIG. 11) and the conductor 60 (FIG. 4) are connected to the battery 16 and looped back through the battery and the closed energized circuit conductor 46 (FIG. 11) and the closed energized circuit conductor 59 (FIG. 4). The conductor 46 (FIG. 11) and the conductor 59 (FIG. 4) connect the normally closed trap 15, controlled by the normally open control switch 11, the normally closed panic switch 14 and the normally closed fire detector 13 in circuit to the lock-in relay 2. The lock-in relay 2 is electrically connected via the conductors 47 and 48 (FIG. 11) and electrical conductors 63 and 64 (FIGS. 3 and 4) to the normally open mat switch 17, controlled by a normally closed control switch 12. In FIG. 11, the conductors 47 and 48 are connected to the normally open panic switch 14, the fire detector 13 and the normally open alarm switch 18. In FIGS. 4 and 11, the lock-in relay 2 for the conductors 47 and 48 (FIG. 11) and the conductors 63 and 64 (FIG. 4) is reset by the normally open reset switch 9.

The radio receiver 10 of any suitable known type (FIGS. 2 and 6) receives signals transmitted by the radio transmitter 7 thereby indicating an alarm condition at such receiver. In FIGS. 7, 10 and 13, the radio receiver 10 has a direction finder 26 for receiving alarm signals transmitted by the radio transmitter 7. This not only indicates an alarm condition at the receiver, but locates the transmitter of the alarm signals and thereby locates the stolen vehicle, a structure, house, or the like, for a law officer.

The embodiments of FIGS. 3, 4, 11 and 12 include the normally open control switch 11 which controls the normally closed trap 15. The embodiments of FIGS. 3 and 4 include the normally closed control switch 12 which controls the normally open mat switch 17. The embodiments of FIGS. 11 and 12 include the normally closed switch 12 which controls the normally open mat switch 17 and the normally open alarm switch 18.

In the embodiment of FIG. 5, the normally closed control switch 12 controls the electric circuit 1. In the embodiments of FIGS. 6 and 7, the normally closed control switch 12 controls the normally open alarm switch 18.

In the embodiment of FIG. 3, the normally closed fire detector 13, the normally closed panic switch 14, the normally closed trap 15 and the battery 16 are connected in circuit with the lock-in relay 2. The fire detector 13 and the panic switch 14 should not be controlled by any control switch, unless desired.

The embodiments of FIGS. 4, 11 and 12 are the same as the embodiment of FIG. 3, except that in FIGS. 4, 11 and 12 the normally open control switch 11 controls the trap 15 only. In the embodiment of FIG. 3, the control switch 11 controls the operation of the normally closed fire detector 13 and the normally closed trap 15.

The embodiments of FIGS. 6 and 7 include the fire detector 13, the panic switch 14 and the alarm switch or switches 18. The embodiment of FIG. 8 includes the normally open fire detector 13 and the embodiment of FIG. 9 includes the alarm switch or switches 18. The embodiment of FIG. 10 includes the existing vehicle door light switch 42.

In the embodiment of FIG. 11, a double trap alarm switch 67 is electrically connected between the terminal 2a of the lock-in relay 2 and the conductors 45 and 48. The double trap 67 is a single pole, double throw alarm switch having a switch arm electrically connected to the battery 16, a first switch contact electrically connected to the terminal 2a of the lock-in relay 2 and a second switch contact electrically connected to the conductor 48 at a point between the terminal 2d of said relay and the control switch 12.

In FIG. 11, the double trap 67 double traps an installation which requires double protection and security and functions to prevent bypassing of the alarm switch by jump-circuiting. The double trap 67 of FIG. 11 also short-circuits the conductor 48 to the alarm circuit conductor 45 when said alarm circuit conductor is open-circuited. The relay energizing winding 2f of the lock-in relay 2 then becomes deenergized and permits the relay contacts 2g to close. The relay energizing winding 2f of the lock-in relay 2 remains deenergized until said relay is reset by the reset switch 9.

While the invention has been described by means of specific examples and in specific embodiments, we do not wish to be limited thereto, for obvious modifications will occur to those skilled in the art without departing from the spirit and scope of the invention.

We claim:

1. A radio alarm system with back up capability having electric circuits for monitoring, controlling, operating and utilizing an electric circuit having electrical conductors including normally closed switches, said radio alarm system comprising
relay means having electrical conductors;
a source of electrical energy;
a radio transmitter for transmitting radio signals; and
electrically conductive leads electrically connecting the
  relay means, the source of electrical energy and the
  radio transmitter in a back up circuit in a manner
  whereby the relay means is energized by electrical
  conductors of the electric circuit having normally
  closed switches and maintains said relay means normally open as long as said radio alarm system is in
  operative condition and when an electrical conductor
  of said radio alarm system is open-circuited, said relay means is deenergized and closes the back up circuit to actuate the transmitter to transmit radio signals indicating that an electrical conductor of a closed circuit of said radio alarm system has been open-circuited, said closed circuit of said radio alarm system and said back up circuit constituting different circuits.

2. A radio alarm system with back up capability having electric circuits for monitoring, controlling, operating and utilizing an electric circuit having electrical conductors including normally open switches, a negative electrical conductor and a positive electrical conductor, said radio alarm system comprising relay means having electrical conductors;

a source of electrical energy;

a radio transmitter for transmitting radio signals; and electrically conductive leads electrically connecting the relay means, the source of electrical energy and the radio transmitter in a back up circuit in a manner whereby the relay means is energized by electrical conductors of the electric circuit having normally open switches and maintains said relay means normally open as long as said radio alarm system is in operative condition and when a negative electrical conductor of said radio alarm system is short-circuited with a positive electrical conductor of said radio alarm system, said relay means is deenergized and closes the back up circuit to actuate the transmitter to transmit radio signals indicating that an electrical conductor of said radio alarm system has been short-circuited, said short-circuited circuit of said radio alarm system and said back up circuit constituting different circuits.

3. A radio alarm system as claimed in claim 1, further comprising an alarm, an alarm switch for actuating the alarm, a fire detector for detecting fire and a panic switch electrically connected to the relay means, said panic switch being manually operable for secret actuation of the alarm.

4. A radio alarm system as claimed in claim 1, further comprising a plurality of fire detectors electrically connected to the relay means and positioned at different locations in an area for detecting fire occurring in the area.

5. A radio alarm system as claimed in claim 1, further comprising a plurality of alarm switches electrically connected to the relay means and positioned at different locations in an area for actuating an alarm.

6. A radio alarm system as claimed in claim 1, wherein said radio alarm system is installed in a vehicle having an interior light source and a plurality of vehicle door light switches electrically connected to the relay means and between the source of electrical energy and the light source in a manner whereby said light source is energized by the operation of any one of said light switches and remains so energized.

7. A radio alarm system as claimed in claim 1, further comprising a radio receiver for receiving signals transmitted by said radio transmitter thereby indicating an alarm condition.

8. A radio alarm system as claimed in claim 1, further comprising a radio receiver having a direction finder for locating the position of said radio transmitter and receiving signals transmitted by said radio transmitter thereby indicating an alarm condition.

9. A radio alarm system as claimed in claim 1, further comprising reset means electrically connected to the relay means for manually resetting the back up circuit.

10. A radio alarm system as claimed in claim 3, further comprising a mat switch electrically connected to said relay means for actuating an alarm when subjected to pressure by a person or object having weight.

11. A radio alarm system as claimed in claim 3, further comprising a trap electrically connected to said relay means and placed in an entry area for actuating the alarm when opened, said trap comprising a plurality of normally closed alarm switches.

12. A radio alarm system as claimed in claim 3, further comprising a control switch electrically connected to said relay means for controlling an entry area to permit a person to pass through a controlled area without actuating the alarm, said control switch being manually reset to operable condition after operation.

13. A radio alarm system as claimed in claim 9, wherein said reset means comprises a reset switch.

14. A radio alarm system as claimed in claim 9, wherein said reset means comprises a combination reset control switch.

15. A radio alarm system as claimed in claim 13, wherein said reset switch comprises a push-button switch which resets said relay means when manually depressed and is reset automatically when manually released thereby placing said alarm in operating condition.

16. A radio alarm system as claimed in claim 3, wherein said alarm comprises an audible alarm.

17. A radio alarm system as claimed in claim 3, wherein said alarm comprises a visible alarm.

18. A radio alarm system as claimed in claim 5, further comprising a negative electrical conductor, a positive electrical conductor and a plurality of normally open switches electrically connected thereto, and wherein said alarm switches are normally closed and are electrically connected to an electrical conductor of a closed circuit of said radio alarm system, said closed circuit including said negative conductor, said positive conductor and said plurality of normally closed switches.

* * * * *